(No Model.) 2 Sheets—Sheet 1.
C. H. PRICE & J. STEVENSON.
COMBINED TRUCK AND BAG HOLDER.
No. 312,016. Patented Feb. 10, 1885.
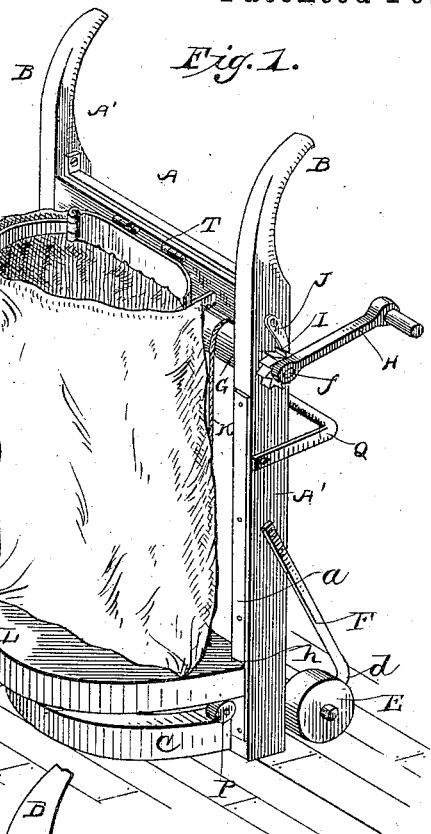
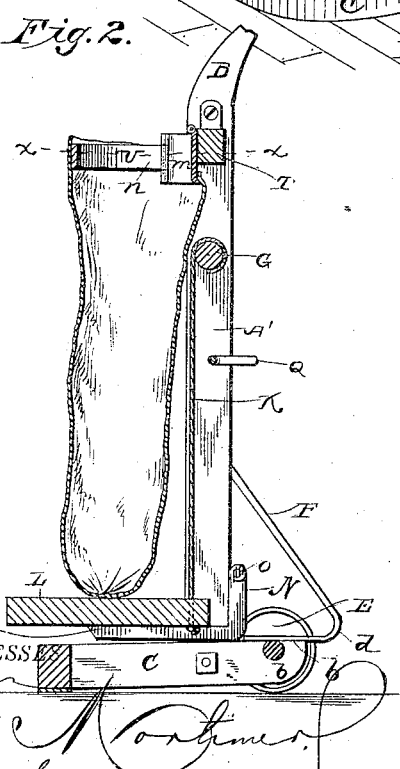
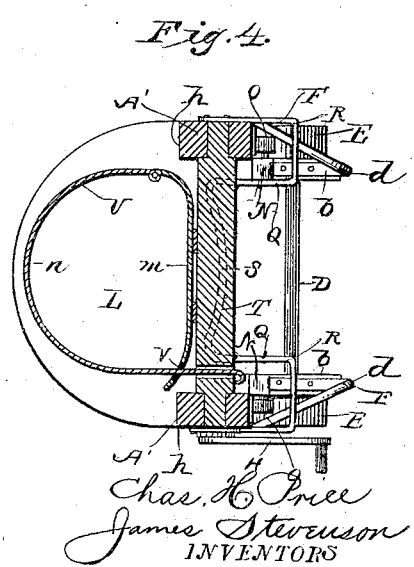
Chas. H. Price
James Stevenson
INVENTORS
by C. A. Snow & Co.
Attorneys (No Model.) 2 Sheets—Sheet 2.
C. H. PRICE & J. STEVENSON.
COMBINED TRUCK AND BAG HOLDER.
No. 312,016. Patented Feb. 10, 1885.
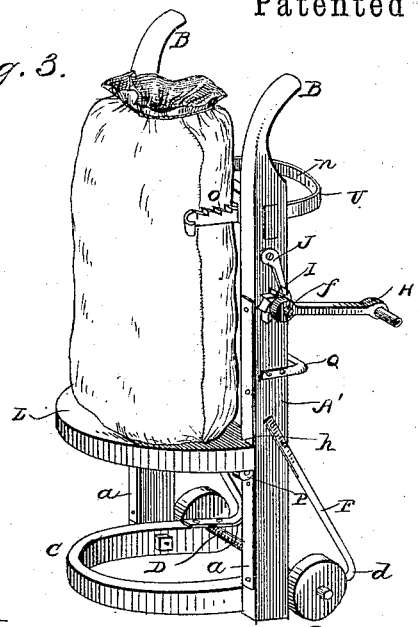
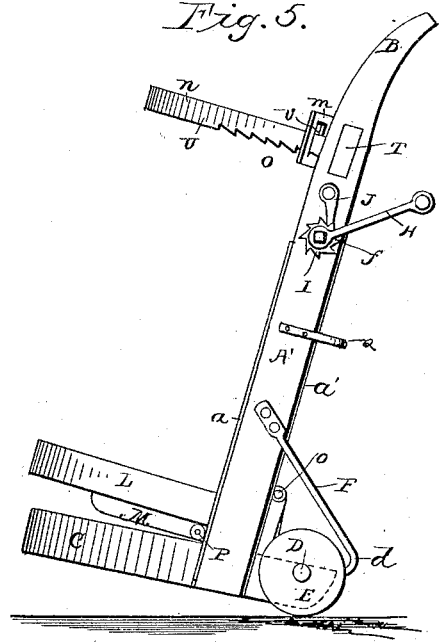
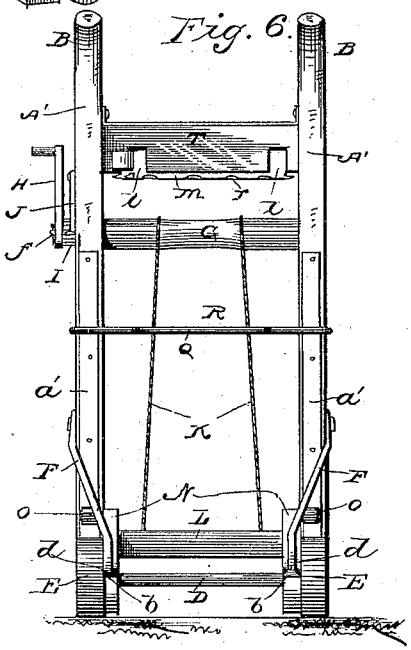
WITNESSES
Chas. H. Price
James Stevenson
INVENTORS
by C. A. Snow &Co.
Attorneys

United States Patent Office.

CHARLES HARVEY PRICE AND JAMES STEVENSON, OF ADRIAN, MICHIGAN.

COMBINED TRUCK AND BAG-HOLDER.

SPECIFICATION forming part of Letters Patent No. 312,016, dated February 10, 1885.

Application filed August 19, 1884. (No model.)

*To all whom it may concern:*

Be it known that we, CHARLES HARVEY PRICE and JAMES STEVENSON, citizens of the United States, residing at Adrian, in the county of Lenawee and State of Michigan, have invented a new and useful Improvement in Combined Truck and Bag-Holder, of which the following is a specification, reference being had to the accompanying drawings.

This invention relates to a combined bag-holder and truck; and it has for its object to provide improved means whereby the truck is retained in an upright position while the bag is being filled, and then lowered to transport the bag to the desired place, in the manner well known.

A further object of the invention is to provide means for holding the bag in an upright position with its mouth open while being filled, said means being adjustable to suit the various sizes of bags. And a still further object is to provide means for raising or lowering the bag along the truck after it is filled, so that it may be readily transferred to the wagon.

With these and other objects in view the said invention consists in certain details of construction and combination of parts, as hereinafter set forth, and particularly pointed out in the claims.

In the accompanying drawings, Figure 1 is a perspective view of our improved combined bag-holder and truck. Fig. 2 is a vertical longitudinal sectional view of the same. Fig. 3 is a perspective view showing the bag filled, the holding-band thrown back, and the vertically-moving platform drawn up to elevate the bag. Fig. 4 is a horizontal section on the line $x\ x$, Fig. 2. Fig. 5 is a side view showing the truck tilted. Fig. 6 is a rear view.

Like letters refer to corresponding parts in the several figures.

Referring to the drawings, A designates the truck, comprising side bars, A' A', having handles B B at one end, and connected by suitable cross-bars, the front and rear sides of the bars being faced with metal, forming tracks $a$ $a'$ for the passage of the raising-platform, as hereinafter described. Between the side bars at the lower end of the truck is secured by bolts and nuts a suitably-curved frame, C, the ends of which extend rearwardly beyond the bars and form bearings for the journals of an axle, D, having at its ends the carrying-wheels E E, which are arranged outside of the frame. The lower edges of the latter are faced with metal to resist wear, and the extreme ends are rounded off, so as not to interfere with the movement of the wheels. Braces or rods F F extend from the outer sides of the bars A' downward, and converge slightly inward toward the curved frame, their ends being bent nearly at right angles and secured to the upper faces of the said frame. The brace-rods F at the point where their ends $b\ b$ are bent inward are rounded, as shown at $d$, so as to rest on the ground, said rounded extensions projecting beyond the carrying-wheels, so that when the truck is in a horizontal position the extensions $d$ rest on the ground and support the same, and thus there will be less liability of the truck moving. When the truck is thrown up into an inclined position, the wheels then come into action, so that the contents may be transported from place to place, as desired. When the truck is thrown up into a vertical position, the curved frame C supports it in place and prevents tilting in either direction.

Journaled in the side bars, A', is a winding-drum, G, which has its shaft $f$ passing through one of the side bars, A', and provided with an operating-handle, H, on its end. A ratchet-wheel, I, is mounted on the shaft between the handle and the adjacent side bar, and is arranged to be engaged by a pivoted pawl, J, attached to the side bar, and adapted to be swung up out of engagement, as desired. Cords or chains K are attached at one end to the said drum, and extend downward, so as to connect with an elevating-platform, L, the latter having notches $h$ cut out of its inner corners, and thus it will fit and work at its inner portion within or between the side bars. Plates M are attached to the under side of the platform at each side, extend rearwardly, and are provided with angular extensions N, which project upward alongside of the bars A', the upper ends of the extensions having friction-rollers O O journaled thereto and working against the rear tracks, $a'$, of the side bars. Rollers P P are journaled on short shafts projecting outward from the plates M forward of the extensions N, the said rollers working on the front tracks, a, of the side bars. It will be seen that by reason of the notches in the corners of the elevating-platform the side bars form ways and guide the movements of the platform, the rollers likewise serving as guides, reducing the friction and steadying the movement of the said platform, so that it will work with ease and rapidity and there will be no possibility of displacement.

Q designates a wire bail or yoke, attached at each end to the outer faces of the side bars, A', bent to form U-shaped rests R R rearward of the side bars, and extending forward at or near the middle of its length to provide a support, S, for the bag when resting on the platform, the face of the support being depressed or concaved to fit the shape of the bag, the latter being held in an upright position.

T designates a cross-bar connecting the side bars, A', and slotted or recessed on the under side, as at l l, a sectional band, U, being hinged to the front face of the cross-bar at the upper end, and adapted to be swung upward and over the same. The band U consists of two sections, m n, one wider than the other, the section n being hinged to the other section at one end, and having its other end serrated or notched, as at o, and passed through a vertical slot, V, in the adjacent end of the section m. The serrations, notches, or teeth o are arranged to engage with the lower wall of this slot in adjusting the band to different sizes of bags, the end of the section n passing through the slot l in the under side of the cross-bar T, and having its extreme end turned outward, as shown at p, to catch around one of the walls of the slot l and hold the band in place. Projections, barbs, or teeth r extend outward from the sections of the band to catch in the bag and hold the mouth of the same open preparatory to filling.

The operation of our invention will be readily understood from the foregoing description, taken in connection with the annexed drawings.

When it is desired to fill the bag, the truck is swung up into the vertical position shown in Fig. 1, the curved frame C resting on the ground and supporting the truck, and the elevating-platform being in the lowered position. A bag is fitted to the holding-band U, and the platform is raised until the lower end of the bag rests on the platform, so as to be supported in position and in readiness to receive the material, which is poured through the mouth of the bag in any suitable manner. When the bag is filled, its mouth is disengaged from the band U and fastened or tied up, the band is thrown back, as shown in Fig. 3, and the drum is turned to raise the platform and elevate the bag along the truck to the height of the wagon or shelf where it is desired to store the same. Should it be necessary to transport the bag from the place where it is filled, the truck may be thrown into an inclined position, so as to cause the wheels to come into action and allow the ready removal of the truck to the desired point, where the bag may be withdrawn from the truck, as before stated. It will be seen that by reason of the sectional hinged band U, which fits within the mouth of the bag, the elevating-platform upon which the bag rests, and the bail or support S, the bag is held in an upright position and all possibility of displacement is obviated. The band may be adjusted to suit the mouths of different-sized bags by moving the hinged section n in or out to decrease or increase the circumference of the band, the serrations or teeth o catching in the lower wall of the slot v and holding said section in the adjusted position. The projections or barbs on the band U catch in the bag and hold the mouth open, and when said bag is filled the hinged band may be thrown up over the cross-bar T', so as not to interfere with fastening the bag. By reason of the vertical movements of the platform the latter can be raised or lowered to suit the length of different-sized bags, or may be elevated to raise the filled bag on a line with a wagon, when it can be easily slid into place, and thus there will be no necessity of raising by manual labor the bag bodily off the truck. In this manner the trouble and labor of transporting the bags, when filled, will be lessened to a considerable degree, so that they may be filled, transported, and loaded in the wagon in an expeditious manner. The pawl and ratchet serves to allow the free forward movement of the drum, and yet check the same from backward movement; but when it is desired to move the platform downward the pawl is disengaged from the ratchet and the drum is turned backward for the purpose well known. When the truck is in a horizontal position, it does not rest on the wheels, but on the rests R of the bail Q and the rounded extensions d of the brace-rods F, so that there will be no possibility of forward movement of the truck while in that position.

The advantages of our invention are numerous. By means of the same we combine with a truck, which is a very handy portable conveyance, a bag-holding attachment adjustable to different sizes of bags, so that the latter may be filled and transported from one place to another in a very short time.

The mechanism employed is simple in construction, convenient in its application, and efficient in use, and will prove of great utility for the purposes intended.

Having described our invention, we claim—

1. In a combined bag-holder and truck, the combination, with the truck and the elevating-platform for the bag to rest on, of the herein-described band for the mouth of the bag, comprising two adjustable sections, one of which is hinged to the truck-frame, so that the entire band may be thrown up back of the truck and out of the way of the bag, as and for the purpose set forth.

2. In a combined bag-holder and truck, the combination, with the truck and the platform for the bag to rest on, of the herein-described adjustable band for the mouth of the bag, comprising two sections hinged to the truck-frame, one of said sections being hinged to the other at one end, and having its other end constructed to be held at any suitable point, said band being thrown back out of the way when not in use, as set forth.

3. In a combined bag-holder and truck, the combination, with the truck and the platform for the bag to rest on, of the herein-described adjustable band for the mouth of the bag, comprising two sections hinged to the truck-frame, one section having one end hinged or pivoted to the other and its other end serrated and passing through a slot in the opposite end of the other section, said serrations or teeth engaging with the lower wall of said slot, for the purpose set forth.

4. In a combined bag-holder and truck, the combination, with the truck, the platform for the bag to rest on, and a cross-bar secured to the upper end of the truck, of an adjustable hinged band attached to the cross-bar and arranged to be thrown up over the said bar, said band comprising two sections, $m$ $n$, the section $n$ being hinged or pivoted at one end to the adjacent end of the section $m$, and having its other end serrated and passing through a slot in the other end of the section $m$, the extreme end passing through a slot, $l$, in the under side of the cross-bar and turned outward, for the purpose set forth.

5. A combined bag-holder and truck, comprising the truck, a curved frame secured to the lower end thereof and having its ends extending rearwardly, the carrying-wheels journaled in the said ends, the braces connecting the frame of the truck to the ends of the curved frame projecting beyond the wheels so as to rest on the ground when the truck is in a horizontal position, an elevating-platform for the bag to rest on, and a band for the mouth of the bag, as set forth.

6. A combined bag-holder and truck, comprising the truck, a band for the mouth of the bag, an elevating-platform for the latter to rest on, a frame at the lower end of the truck to support the same in an upright position, and braces attached to the truck-frame and projecting beyond the wheels so as to rest on the ground when the truck is in a horizontal position, as set forth.

7. A combined bag-holder and truck, comprising the truck, a band for the mouth of the bag, an elevating-platform for the latter to rest on, a frame at the lower end of the truck, braces connected to the latter and projecting beyond the carrying-wheels, to rest on the ground when in a horizontal position, and a bail or support attached to the truck-frame at an intermediate point, so as to provide rests for the same and also support for the bag, as set forth.

8. A combined bag-holder and truck, comprising a hinged band for the mouth of the bag, an elevating-platform for the latter to rest on, a truck, braces secured to the latter and projecting beyond the carrying-wheels, to rest on the ground when the truck is in a horizontal position, and a bail or support attached to the truck at an intermediate point, and providing a support for the bag and rests for the truck-frame, as set forth.

9. A combined bag-holder and truck, comprising a truck, a band for the mouth of the bag, an elevating-platform carrying wheels or rollers which work on the front and rear faces of the side bars of the truck, and a frame attached to the lower end of the truck, as set forth.

10. A combined bag-holder and truck, comprising the truck, a band for the mouth of the bag, an elevating-platform for the bag to rest on, and a bail or yoke having its ends attached to the truck-frame, bent to form rests, and then extending forward between the sides of the truck-frame, and shaped to fit the bag, so as to form a support for the same, as set forth.

In testimony that we claim the foregoing as our own we have hereto affixed our signatures in presence of two witnesses.

CHARLES HARVEY PRICE.
    JAMES STEVENSON.

Witnesses:
    WM. B. THOMPSON,
    JAS. M. DODGE.